(12) United States Patent
Cheung et al.

(10) Patent No.: US 10,786,119 B2
(45) Date of Patent: Sep. 29, 2020

(54) MULTI-FUNCTION FOOD PROCESSING DEVICE

(71) Applicant: Huiyang Allan Plastic & Electric Industries Co., Limited, Huizhou, Guangdong (CN)

(72) Inventors: Shu Sang Cheung, Huizhou (CN); Gang Zhi Liu, Huizhou (CN)

(73) Assignee: Huiyang Allan Plastic & Electric Industries Co., Limited, Guangdong (CN)

(*) Notice: Subject to any disclaimer, the term of this patent is extended or adjusted under 35 U.S.C. 154(b) by 194 days.

(21) Appl. No.: 16/004,263

(22) Filed: Jun. 8, 2018

(65) Prior Publication Data

US 2019/0014948 A1 Jan. 17, 2019

(30) Foreign Application Priority Data

Jul. 14, 2017 (CN) .......................... 2017 1 0574754

(51) Int. Cl.
*A47J 43/00* (2006.01)
*A47J 43/25* (2006.01)
*B26D 3/11* (2006.01)
*A47J 43/07* (2006.01)

(52) U.S. Cl.
CPC ......... *A47J 43/255* (2013.01); *A47J 43/0722* (2013.01); *B26D 3/11* (2013.01)

(58) Field of Classification Search
CPC .... A47J 43/255; A47J 43/0722; A47J 43/044; B26D 3/11

USPC ................................................. 241/92, 273.2
See application file for complete search history.

(56) References Cited

U.S. PATENT DOCUMENTS

| | | | | | |
|---|---|---|---|---|---|
| 2,852,200 | A | * | 9/1958 | Holzer | E03C 1/2665 |
| | | | | | 241/92 |
| 3,410,495 | A | * | 11/1968 | Eklund | B27L 11/02 |
| | | | | | 241/278.1 |
| 3,572,594 | A | * | 3/1971 | Kershaw | B27L 11/02 |
| | | | | | 241/55 |
| 4,190,208 | A | * | 2/1980 | Schaeffer | A47J 43/06 |
| | | | | | 241/282.2 |
| 4,199,112 | A | * | 4/1980 | McLean | A47J 43/06 |
| | | | | | 241/273.2 |
| 4,317,544 | A | * | 3/1982 | Lapointe | B02C 18/143 |
| | | | | | 144/176 |

(Continued)

*Primary Examiner* — Faye Francis
(74) *Attorney, Agent, or Firm* — Intellectual Property Law Group LLP

(57) ABSTRACT

A multi-function food processor, for cutting food, fruits or vegetables into continuous ribbons or strips, having a body base, body shell and upper cover, all configured to removably receive a bowl. The upper cover has an upper cover base, a feeding tube and pusher. There is a drive unit provided inside the body shell and a cutter disk provided between the drive unit and upper cover. The cutter disk has a disk with a centrally located core cutter extending therefrom and a slot extending from an outer edge of the disk to the core cutter that is provided with a shredder. The feeding tube is adjustable between a central position, where the feeding tube is co-axial with the core cutter, and an eccentric position, where the feeding tube is offset from the core cutter. There is a double-faced cutter for cutting different sized strips, including continuous spiral ribbons.

20 Claims, 10 Drawing Sheets

(56) References Cited

U.S. PATENT DOCUMENTS

| | | | | |
|---|---|---|---|---|
| 4,471,915 A * | 9/1984 | Levin | A47J 43/046 | 241/282.1 |
| 5,037,033 A * | 8/1991 | Stottmann | A47J 43/046 | 241/37.5 |
| 5,080,153 A * | 1/1992 | Waterman | B27L 11/005 | 144/162.1 |
| 5,137,219 A * | 8/1992 | Morey | B02C 18/22 | 144/176 |
| 5,358,189 A * | 10/1994 | Vandermolen | B02C 13/04 | 241/101.762 |
| 5,385,308 A * | 1/1995 | Gearing | B02C 18/143 | 241/101.78 |
| 5,605,291 A * | 2/1997 | Doskocil | B02C 13/04 | 241/194 |
| 5,961,057 A * | 10/1999 | Turner | B02C 18/143 | 144/176 |
| 6,027,055 A * | 2/2000 | Doskocil | B02C 18/143 | 241/225 |
| 6,397,736 B1 * | 6/2002 | Tseng | A47J 19/027 | 99/511 |
| 6,742,447 B1 * | 6/2004 | Chen | A23N 1/02 | 99/510 |
| 7,252,252 B2 * | 8/2007 | Mauch | A47J 43/0716 | 241/282.1 |
| 7,328,864 B2 * | 2/2008 | Narai | A47J 43/255 | 241/273.2 |
| 7,481,155 B2 * | 1/2009 | Larsen | A47J 19/027 | 241/37.5 |
| 7,644,883 B2 * | 1/2010 | Mauch | A47J 43/0716 | 241/282.1 |
| 7,798,436 B2 * | 9/2010 | Cornelius | A01G 3/002 | 241/298 |
| 7,896,268 B2 * | 3/2011 | Robinson | B27L 11/06 | 144/176 |
| 8,002,774 B2 * | 8/2011 | Burmeister, III | A61F 2/4644 | 606/79 |
| 8,051,887 B2 * | 11/2011 | Robinson | B27L 11/005 | 144/373 |
| 8,794,133 B2 * | 8/2014 | Fister | A23N 1/02 | 99/503 |
| 10,028,619 B2 * | 7/2018 | Aramburo | A47J 43/0722 | |
| 2006/0011760 A1 * | 1/2006 | Hsu | A47J 19/027 | 241/92 |

\* cited by examiner

MULTI-FUNCTION FOOD PROCESSING DEVICE

CROSS-REFERENCE TO RELATED APPLICATION

This application claims benefit of China patent application no. 201710574754.1 filed Jul. 14, 2017, the disclosure of which is hereby incorporated by reference in its entirety for all purposes.

BACKGROUND OF THE INVENTION

Field of Invention

Embodiments of the invention relate to a food processor, and more particularly, to a food processor having a spiralizer feature.

Background

In general, a food processor is used to slice, grate, chop or otherwise cut a food ingredient, such as vegetables, fruits, nuts and meats. Typically, food processors have a disk at the top of a bowl, wherein the disk has a blade system at and along a single radius of the disk for cutting the food ingredient. A lid on the bowl covers the disk. Typically, the lid includes a feed tube via which a food ingredient can be delivered into the bowl as the disk is rotated. In this way that the blade system can slice, grate, chop or otherwise cut the food ingredient, which then falls into the bottom of the bowl.

The disk is rotated on a spindle at the center of the bowl. The feed tube in the lid is offset from the spindle such that the food ingredient is delivered into the blade system only at a radius of the disc outside of a central area of the disk to which the spindle is attached. The bowl sits on a base housing a motor. The spindle is turned directly by the motor in the base, which is positioned underneath the bowl, or indirectly through either a gear drive system or a belt/pulley system in the base driven by the motor located in the base next to the bowl. In addition to or as an alternative to rotating the disc with the top blade system, the spindle can rotate a lower blade system located at the bottom of the bowl for mixing food ingredients or additional cutting of a food ingredient.

At present the majority of food processing devices in the kitchen are used with different cutting accessories which require a user to frequently replace the cutting accessories. This is considered a complex and costly operation that can be unsafe.

SUMMARY OF THE INVENTION

Accordingly, embodiments of the invention are directed to a multi-function food processor that substantially obviates one or more of the problems due to limitations and disadvantages of the prior art.

An object of embodiments of the invention is provide a multi-function food that can spiral cut a food ingredient into different continuous spiral ribbon or strips. The invention provides a multi-function food processor according to claim 1.

Additional features and advantages of embodiments of the invention will be set forth in the following description, and in part will be apparent from the description, or may be learned by practice of embodiments of the invention. The objectives and other advantages of the embodiments of the invention will be realized and attained by the structure particularly pointed out in the description and the claims as well as the appended drawings.

To achieve these and other advantages, and in accordance with the purpose of embodiments of the invention, as embodied and broadly described, a multi-function food processor, comprising: a body base, a body shell and an upper cover, all configured to removably receive a bowl, and wherein the upper cover has an upper cover base, a feeding tube and a pusher to urge food via the feeding tube into the received bowl; a drive unit provided inside the body shell; a cutter disk provided between the drive unit and the upper cover; wherein said cutter disk comprises a disk with a centrally located core cutter extending therefrom and a slot extending from an outer edge of the disk to the core cutter that is provided with shredding means, and wherein the core cutter extends beyond the shredding means; and wherein the feeding tube is adjustable between a central position, where the feeding tube is co-axial with the core cutter, and an eccentric position, where the feeding tube is offset from the core cutter.

Preferably, the disk may comprise a disk top face and a disk bottom face and so the slot comprises a first slot and a second slot arranged in a straight line; said shredding means comprising a fine shredding cutter and a coarse shredding cutter, wherein the fine shredding cutter is fixed to the first slot on the disk top face and the coarse shredding cutter is fixed to the second slot on the disk bottom face.

Further preferably the fine shredding cutter may comprise a first supporter, a first shredding cutter blade and a first shredding cutter saw blade; said the coarse shredding cutter is provided with a second supporter, a second shredding cutter blade and a second shredding cutter saw blade; and wherein a distance that the first supporter extends from the disk top face is less than a distance that the second supporter extends from the disk bottom face, such that the distance between the first shredding cutter blade and first shredding cutter saw blade is less than the distance between the second shredding cutter blade and second shredding cutter saw blade.

Preferably, the feeding tube may comprise a center feed tube coaxial with the cutter disk and an outer feed tube on the side of the center feed tube, and wherein the center feed tube is configured to facilitate the formation of continuous spiral ribbons of food, and the outer feed tube is configured to facilitate the formation of strips of food.

Further preferably the feeding tube may comprise a feed tube cover provided at the connection between the center feed tube and the outer feed tube.

In another aspect, the feeding tube comprises a cylindrical feed tube and the upper cover is provided with a slider latch which facilitates the movement of the feeding tube between the central and eccentric positions, and wherein the bottom of the upper cover base is provided with a stopper configured to limit the movement of the feeding tube and the slider latch relative to the upper cover base.

Further, the body shell may comprise a gear enclosure with a fixed ring and a gear set cover installed on the gear enclosure.

Further preferably, the drive unit may comprise a motor connected to a gear set via a motor output shaft, and a gear frame, within which the cutter disk is located; a disk holder is provided inside the gear frame, said disk holder being configured to mesh with the gear set; and wherein the motor, the motor output shaft and the gear set are received in the gear enclosure and the gear frame is received in the fixed ring.

Further preferably still, wherein the gear frame may comprise an upper frame and a lower frame, with the disk holder arranged between the upper and lower frame; wherein the edge of the upper frame is provided with a groove; and wherein a lower disc holder is provided between the disk holder and the lower frame, and an upper disc holder is provided between the disk holder and the upper frame.

Alternatively, the gear set may comprise a drive shaft arranged coaxially with a gear set holder, a bushing, a disk holder, a planetary gear set, and a drive gear body with a drive gear; and wherein the disk holder meshes with the drive gear body.

Further preferably, the planetary gear set may comprise three planetary gear sets.

It is to be understood that both the foregoing general description and the following detailed description are exemplary and explanatory and are intended to provide further explanation of embodiments of the invention as claimed.

BRIEF DESCRIPTION OF DRAWINGS

In order to more fully describe embodiments of the present invention, reference is made to the accompanying drawings. These drawings, which are merely illustrative and are not to be considered limitations in the scope of the invention.

DETAILED DESCRIPTION OF THE INVENTION

Figure 1:
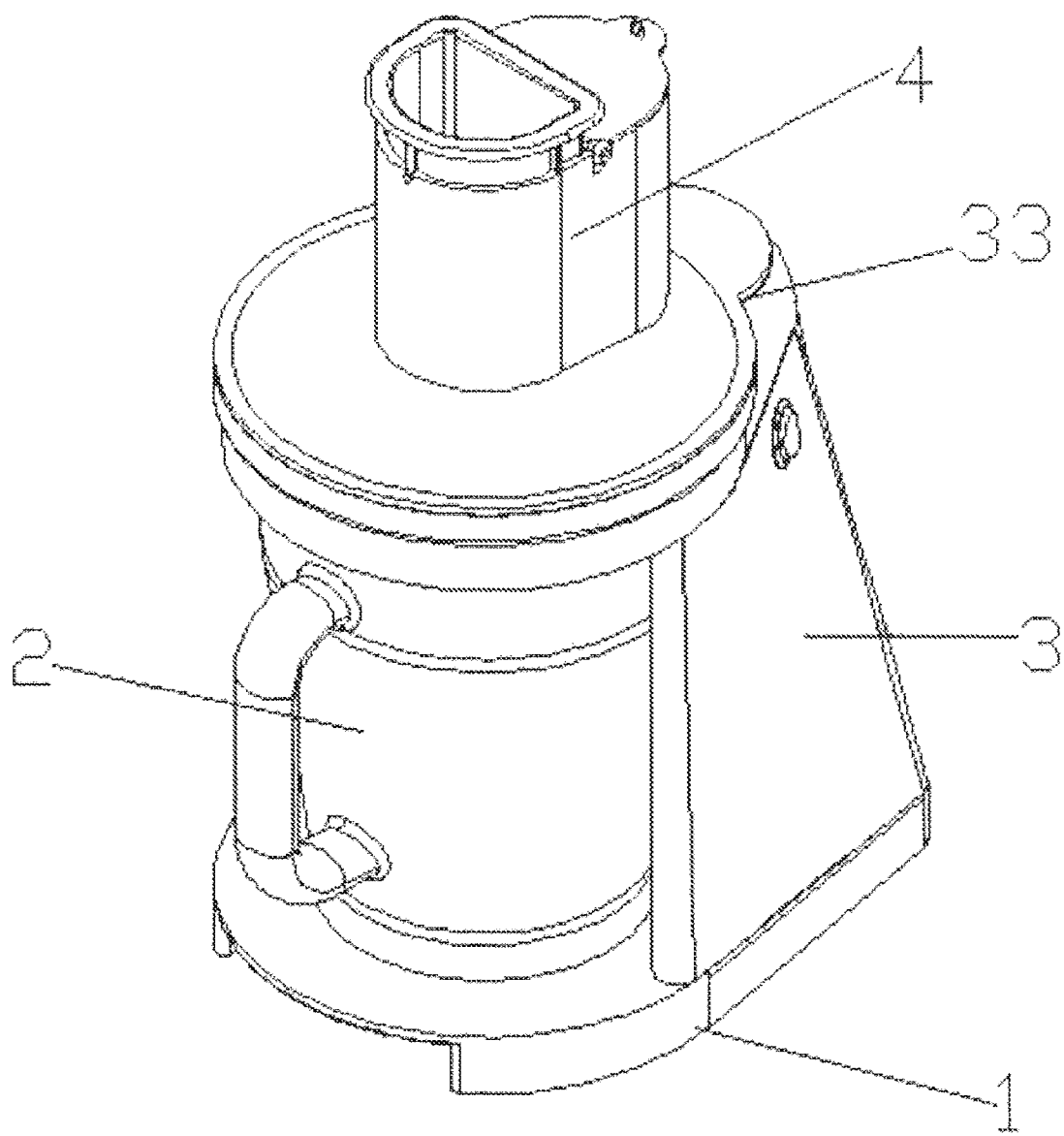
FIG. 1 is a schematic diagram of the overall structure of the multi-function food so processor according to a first embodiment of the present invention.

Reference will now be made in detail to the preferred embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. Those of ordinary skill in the art would recognize variations, modifications, and alternatives. Such variations, modifications, and alternatives are also within the scope of the present invention. In the drawings, the thicknesses of layers and regions may be exaggerated for clarity.

Figure 2:
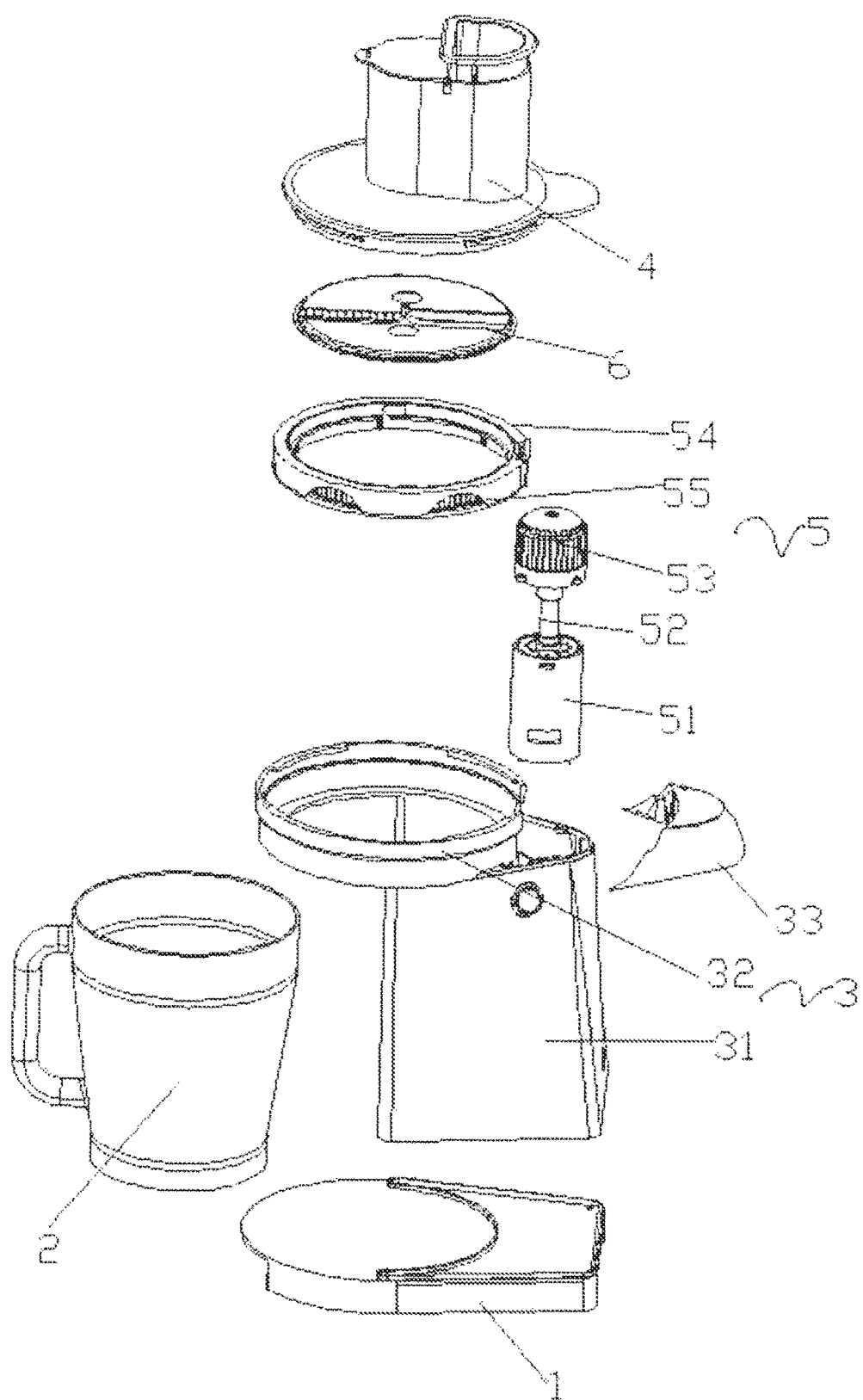
FIG. 2 is an exploded view of the overall structure of the multi-function food processor according to a first embodiment of the present invention.
Figure 3:
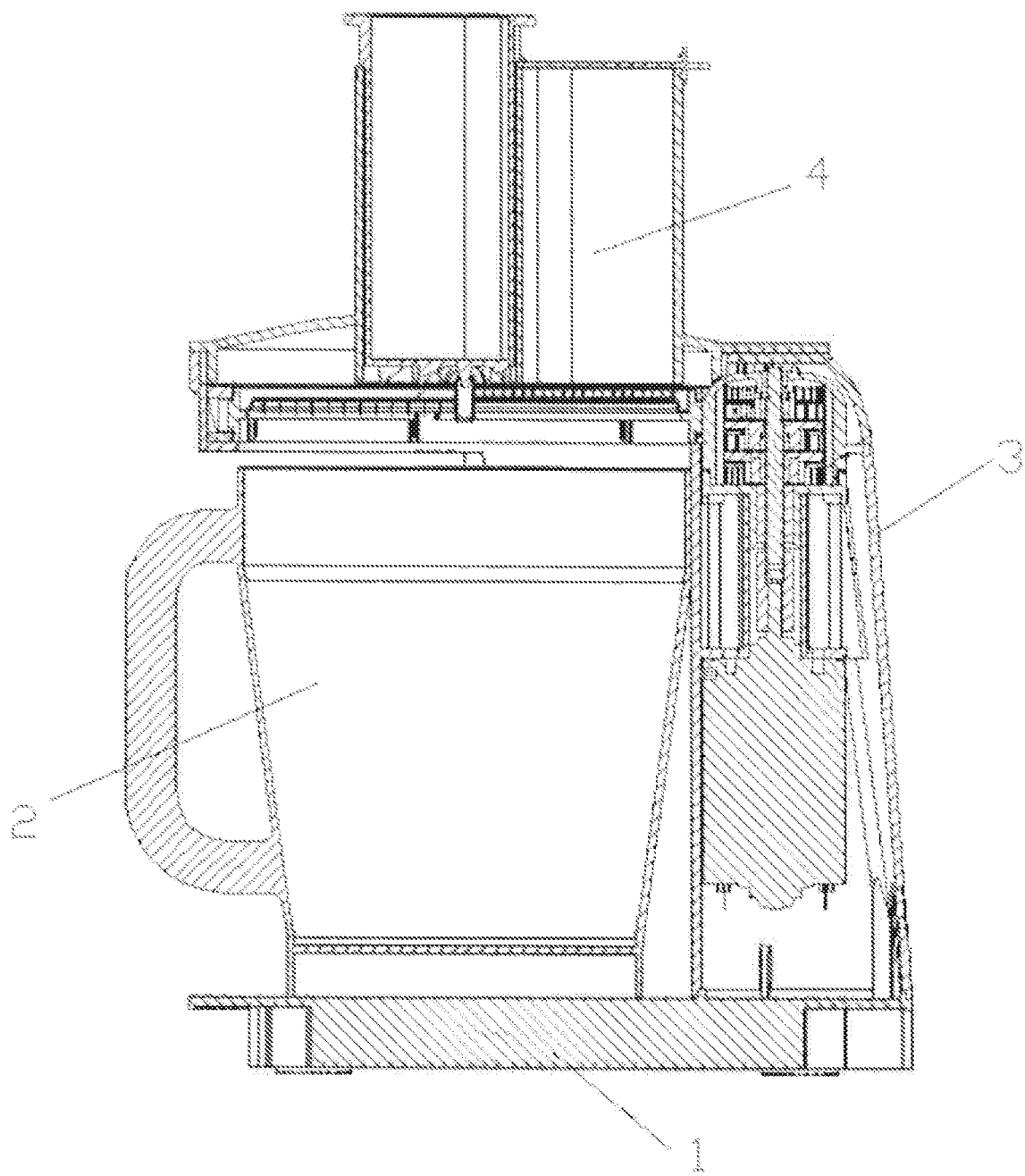
FIG. 3 is a section view of the overall structure of the multi-function food processor according to the first embodiment of the present invention.

As shown in FIGS. 1-3, a multi-function food processor comprises a body base 1, a bowl 2, a body shell 3, an upper cover 4, the bowl and the body shell are mounted in line on the body base. A drive unit 5 is provided inside the body shell. A cutter disk 6 is provided between the drive unit and the upper cover. The upper cover is comprised of an upper cover base 41, a feeding tube 42 and a pusher 43 to urge food into the feeding tube.

The feeding tube is adjustable between a central position, where the feeding tube is co-axial with the core cutter, and an eccentric position, where the feeding tube is offset from the core cutter. When the feeding tube is located in the central position and the food is fed into the feeding tube, starting the drive unit will cause the food to be cut into a continuous spiral ribbon. When the feeding tube is located in the eccentric position and the food is fed into the feeding tube, starting the drive unit will cause the food to be cut into strips.

Figure 7:
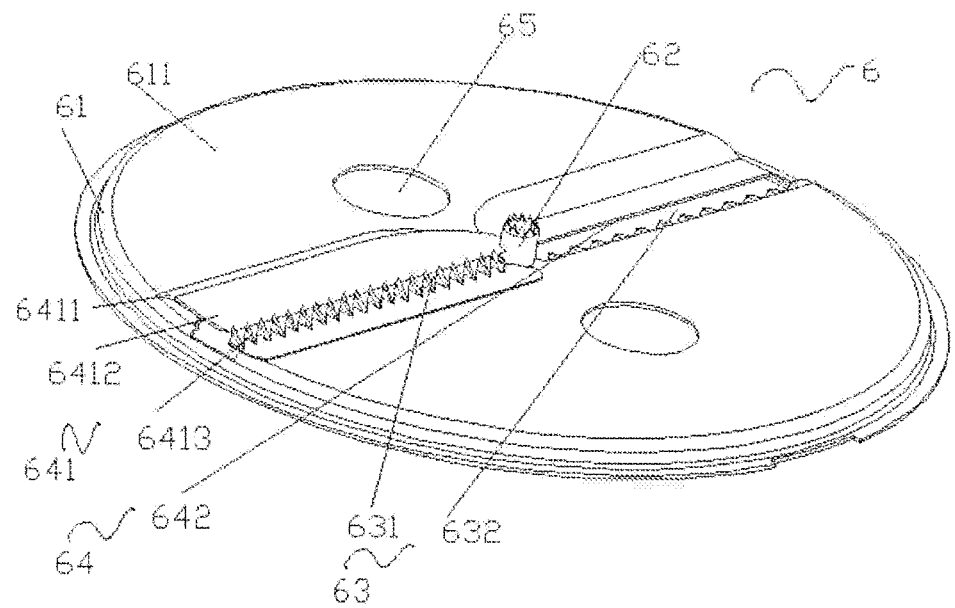
FIG. 7 is a cutter disk schematic diagram of the multi-function food processor with the fine shredding cutter facing up, according to an embodiment of the present invention.
Figure 8:
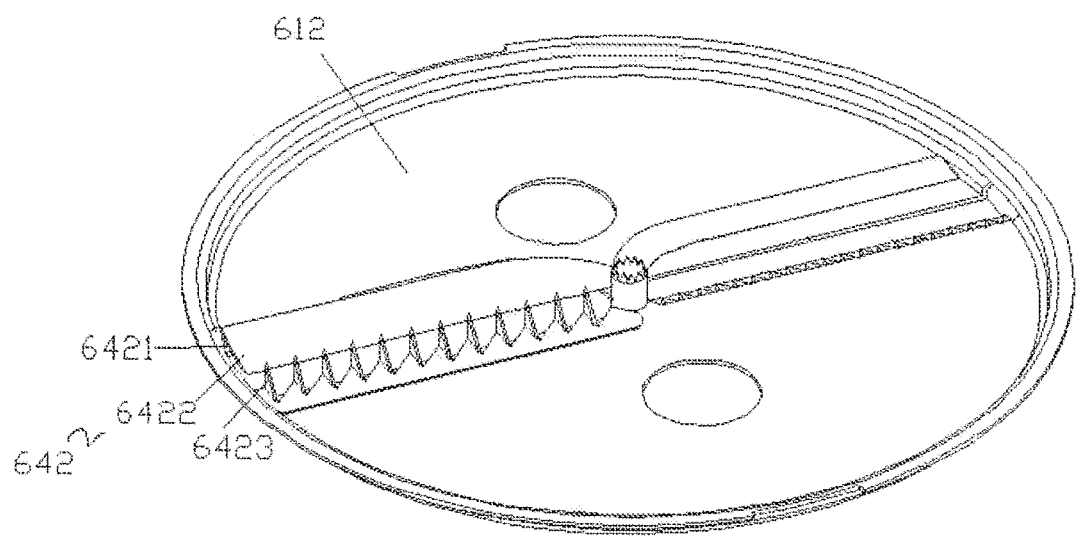
FIG. 8 is a cutter disk schematic diagram of the multi-function food processor with the coarse shredding cutter facing up, according to an embodiment of the present invention.

As shown in FIGS. 7 and 8, the cutter disk 6 comprises a disk 61. A core cutter 62 extends upwards from the center of the disk. Shredding means 64 are provided on a slot 63 that extends between the outer edge of the disk and the core cutter. The core cutter is higher than the shredding disk.

The disk 61 comprises a disk top face 611 and a disk bottom face 612, the slot comprises a first slot 631 and a second slot 632 which are aligned along a straight line. The shredding means 64 comprises a fine shredding cutter 641 and a coarse shredding cutter 642. The fine shredding cutter is on the disk top face and is fixed on the first slot. The coarse shredding cutter is on the disk bottom face and is fixed on the second slot.

The fine shredding cutter 641 comprises a first supporter 6411, a first fine shredding cutter 6412 and a second fine shredding cutter 6413. The first fine shredding cutter is a blade and the second fine shredding cutter is a saw blade.

The coarse shredding cutter is provided with a second supporter 6421, a first coarse shredding cutter 6422 and a second coarse shredding cutter 6423. The first coarse shredding cutter is a blade and the second coarse shredding cutter is a saw blade.

The vertical height of the fine shredding cutter supporter from the disk top face is less than the vertical height of the coarse shredding cutter supporter from the disk bottom face. The distance between adjacent fine shredding cutter blade and fine shredding cutter saw blade is less than the distance between the coarse shredding cutter blade and coarse shredding cutter saw blade.

Therefore, when a user needs to create fine strips of food, the fine shredding cutter is faced upwards towards the feeding tube and the drive unit is started. In this way fine strips or fine continuous spiral ribbon are produced.

When a user needs to create coarse strips of food, the coarse shredding cutter is faced upwards, and the drive unit is started. This arrangement produces coarse strips or coarse continuous spiral ribbons of food.

The body shell 3 comprises a gear enclosure 31, where a fixed ring 32 and a gear set cover 33 are installed on the gear enclosure. The drive unit 5 comprises a motor 51, a motor output shaft 52, a gear set 53 and a gear frame 54, the motor so output shaft connects the motor and gear set, and the cutter disk is assembled on the gear frame, a disk holder 55 is assembled inside gear frame, the gear set meshes with the disk holder; the motor, the motor output shaft and the gear set are installed inside the gear enclosure, the gear frame is installed inside the fixed ring.

Figure 5:
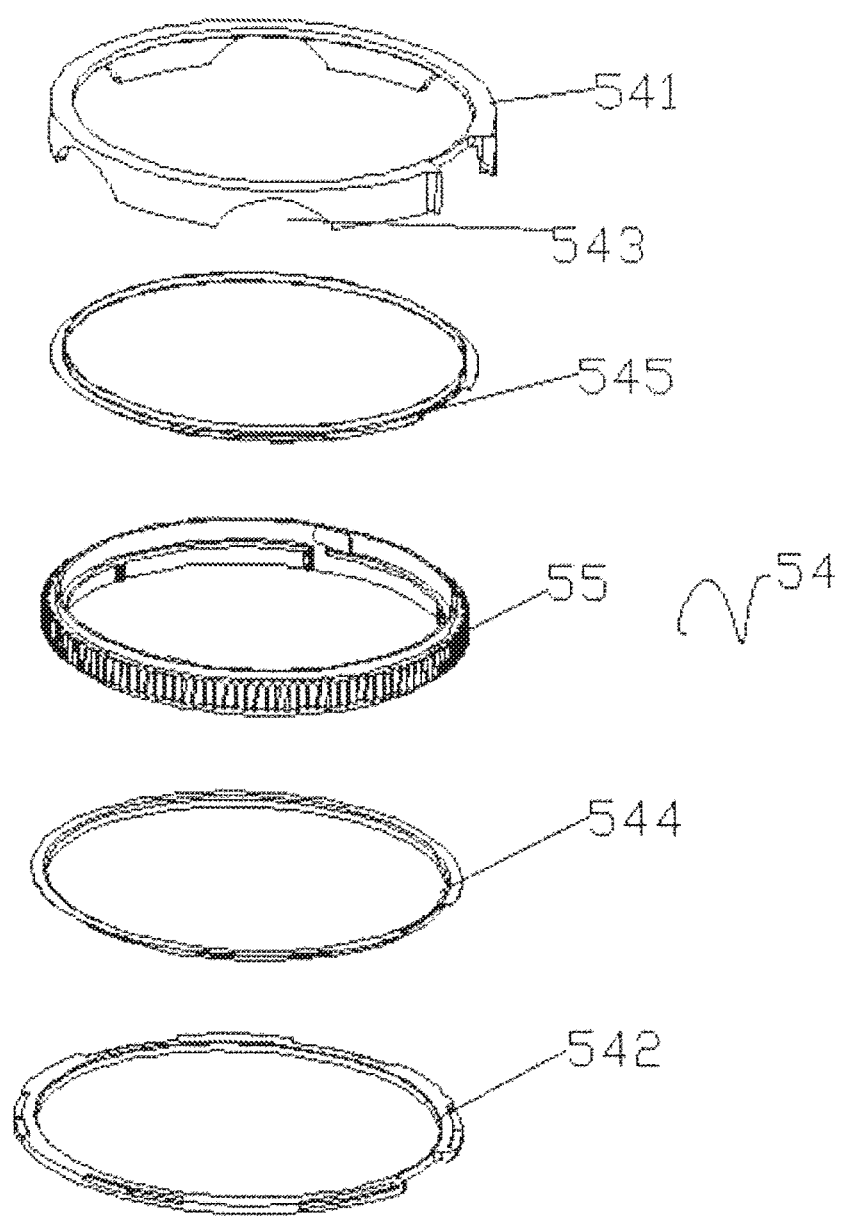
FIG. 5 is an exploded view of the gear frame and the disk holder of the multi-function food processor according to an embodiment of the present invention.
Figure 6:
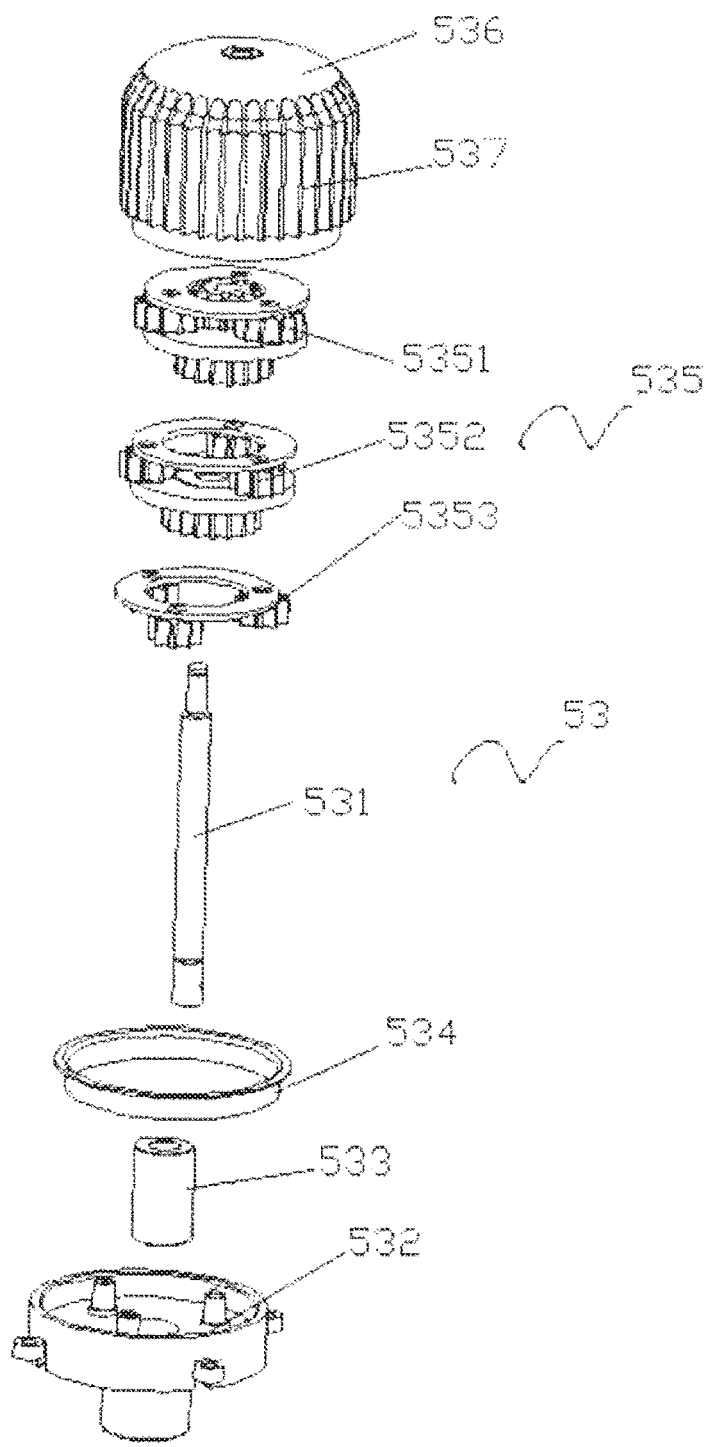
FIG. 6 is an exploded view of the gear set of the multi-function food processor according to an embodiment of the present invention.

As shown in FIGS. 5 and 6, the gear set 53 comprises a drive shaft 531, and in the drive shaft in turn with its coaxial a gear set holder 532, a bushing 533, a disk holder 534, a planetary gear set 535, a drive gear body. The disk holder meshes with the drive gear body which has a drive gear 537.

Depending on the speed required, the user selects multi-planetary gear sets for slowing or low speed motor. Deceleration is achieved by three planetary gear sets in the invention, the planetary gear set 535 comprises three planetary gear sets (5351, 5352, 5353), the planetary gear sets—A 5351, the planetary gear sets—B 5352 and the a planetary gear sets—C 5353 are matched with each other to achieve deceleration. The power provided by the motor is transmitted from the motor output shaft to the gear set to achieve the speed required for the used.

The gear frame 54 comprises an upper frame 541 and a lower frame 542, the disk holder is assembled between the upper frame and lower frame, the edge of the upper frame is provided with a groove 543, a lower disc holder 544 is assembled between the disk holder and the lower frame, an upper disc holder 545 is assembled between the disk holder and the upper frame. The cutter disk and the disk holder are assembled on the gear frame; the gear set meshing with the disk holder which is exposed through the groove of the upper frame. The gear set drives the disk holder by the drive gear of the drive gear body, so as to drive the cutter disk to rotate and process food.

Figure 4:
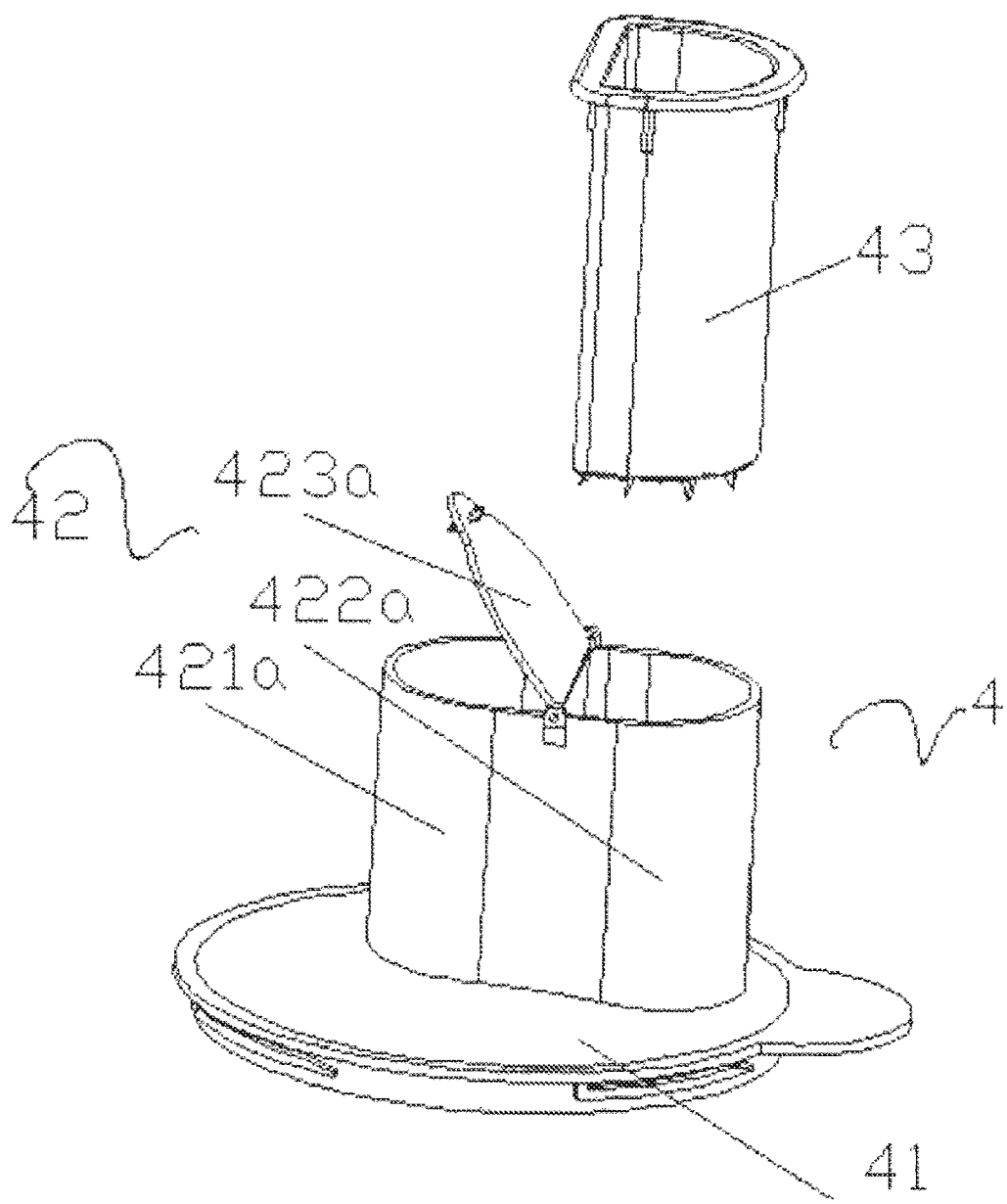
FIG. 4 is a schematic diagram of the upper cover of the multi-function food processor according to the first embodiment of the present invention.
Figure 9:
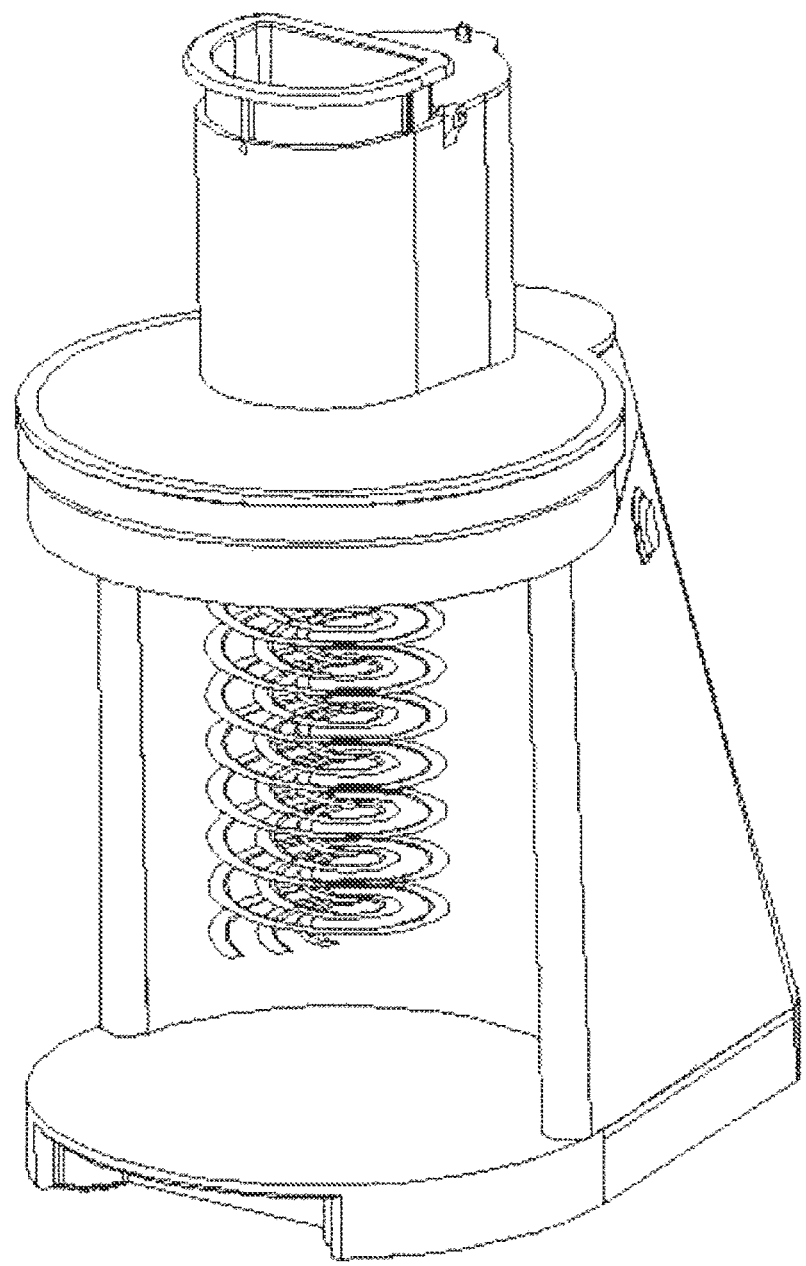
FIG. 9 is a schematic diagram of the multi-function food processor for cutting continuous spiral strips, according to the first embodiment of the present invention.
Figure 10:
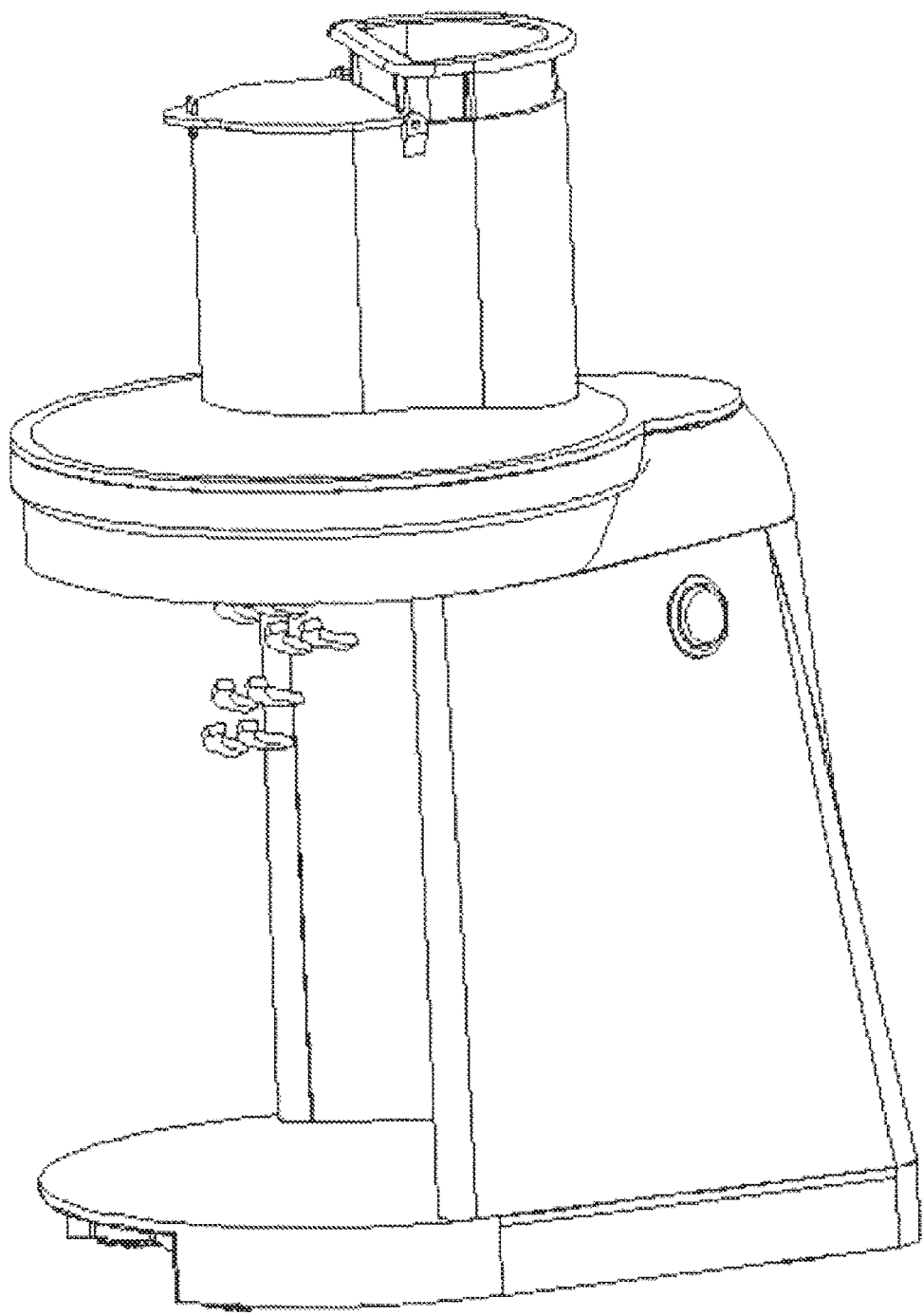
FIG. 10 is a schematic diagram of the multi-function food processor for cutting strips, according to a first embodiment of the present invention.

A first preferred embodiment of the invention is shown in FIGS. 4, 9 and 10, the feeding tube 42 is provided with a center feed tube 421a for processing continuous spiral ribbon and an outer feed tube 422a for processing strips. The center feed tube is coaxial with the cutter disk, the outer feed tube is on the side of the center feed tube offset from the cutter disk.

A feed tube cover 423a is provided at the connection between the center feed tube and the outer feed tube.

When food is fed into the center feed tube, keeping the fine shredding cutter facing up and the feed tube cover over the outer feed tube, starting the drive unit produces fine continuous spiral ribbon from the food.

When food is fed into the outer feed tube, keeping the fine shredding cutter facing up and the feed tube cover on the center feed tube, starting the drive unit produces fine strips of food.

When the cutter disk is reversed so that the coarse shredding cutter faces upwards, feeding food into the center feed tube, whilst keeping the feed tube cover on the outer feed tube, and starting the drive unit produces a coarse continuous spiral ribbon of food.

When food is fed into the outer feed tube, keeping the coarse shredding cutter face up and the feed tube cover over the center feed tube, starting the drive unit produces coarse strips of food.

Figure 11:
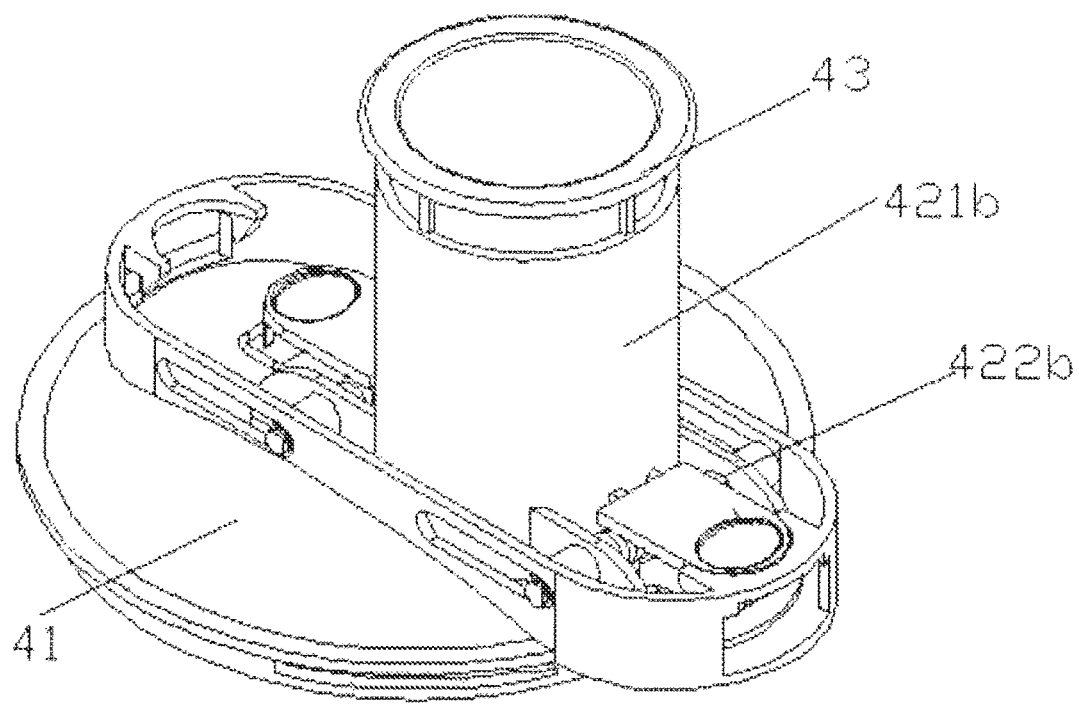
FIG. 11 is a schematic diagram of the upper cover of the multi-function food processor according to a second embodiment of the present invention.
Figure 12:
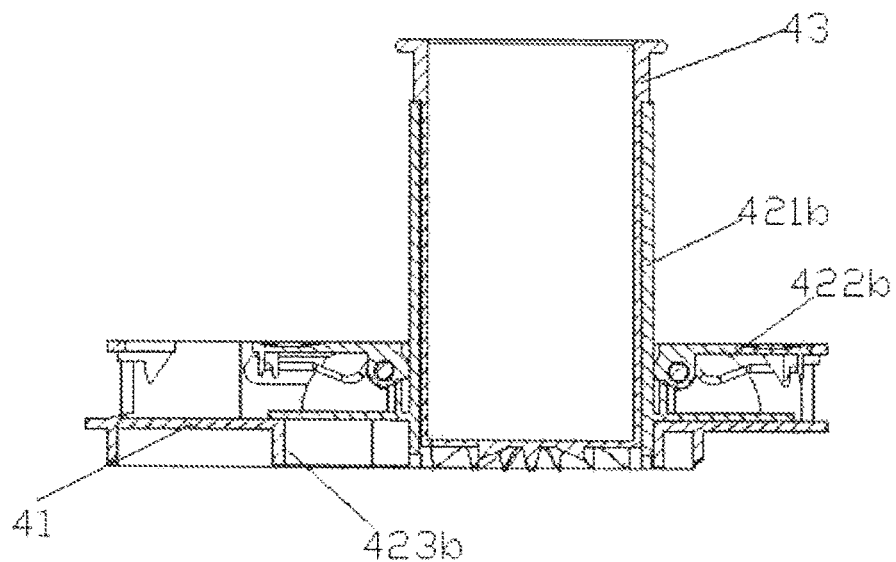
FIG. 12 is a section view of the upper cover of the multi-function food processor according to the second embodiment of the present invention.

A second embodiment of the present invention is shown in FIGS. 11-12. The second embodiment is the same basic structure as the first embodiment, with the exception that the feeding tubes are different.

In the second embodiment the feeding tube 42 is a feed tube 421b which is cylindrical, the upper cover is provided with a slider latch 422b which control the feeding tube in center and outer of the disk to move back and forth.

The bottom of the upper cover base 41 is provided with a stopper 423b configured to limit the movement of the feeding tube 42 and the slider latch 422b relative to the upper cover base. This ensures that the feeding tube always delivers the food into the bowl via the cutter disk 6.

Pushing the slider latch so that the feeding tube is located in the center of the cutter disk, positions the feeding tube coaxially to the cutter disk, where it is then locked. Then during use, when the fine shredding cutter is face up, food is fed into the feeding tube and the drive unit is started to get a fine continuous spiral ribbon of food.

Pushing the slider latch so that the feeding tube is located eccentric of the cutter disk, positions the feeding tube and the core cutter of the cutter disk on the same side, where it is then locked. Then during use, food is fed into the feeding tube and the drive unit started to get fine strips of food.

If coarse cutting is required the user can reverse the cutter disk so that the coarse shredding cutter is face up. Pushing the slider latch so that the feeding tube is located in the center of the cutter disk, positions the feeding tube coaxially to the cutter disk, where it is then locked. Then during use food is fed into the feeding tube and the drive unit is started to get a coarse continuous spiral ribbon of food Pushing the slider latch so that the feeding tube is located eccentric of the cutter disk, positions the feeding tube and the core cutter of the cutter disk on the same side, where it is then locked. Then during use, food is fed into the feeding tube and the drive unit started to get coarse strips of food.

It will be apparent to those skilled in the art that various modifications and variations can be made in the embodiments of the invention without departing from the spirit or scope of the invention. Thus, it is intended that embodiments of the invention cover the modifications and variations of this invention provided they come within the scope of the appended claims and their equivalents.

REFERENCE NUMERALS 1 body base
2 bowl
3 body shell
31 gear enclosure
32 fixed ring
33 gear set cover
4 upper cover
41 upper cover base
42 feeding tube
421a center feed tube
422a outer feed tube
423a feed tube cover
421b feed tube
422b slider latch
423b stopper
43 pusher
5 drive unit
51 motor
52 motor output shaft
53 gear set
531 drive shaft
532 gear set holder
533 bushing
534 disc holder
535 planetary gear set 5351 planetary gear set-A
5352 planetary gear set-B
5353 planetary gear set-C
536 drive gear body
537 drive gear
54 gear frame
541 upper frame
542 lower frame
543 groove
544 lower disc holder
545 upper disc holder
55 disk holder
6 cutter disk
61 disk
611 disk top face
612 disk bottom face
62 core cutter
63 slot
631 first slot
632 second slot
64 shredding disk
641 fine shredding cutter
6411 fine shredding cutter supporter
6412 first fine shredding cutter
6413 second fine shredding cutter
642 coarse shredding cutter
6421 coarse shredding cutter supporter
6422 first coarse shredding cutter
6423 second coarse shredding cutter

What is claimed is:

1. A multi-function food processor, comprising:
a body base (1), a body shell (3) and an upper cover (4), all configured to removably receive a bowl (2), and wherein the upper cover (4) has an upper cover base (41), a feeding tube (42) and a pusher (43) to urge food via the feeding tube (42) into the bowl (2);
a drive unit (5) provided inside the body shell (3);
a cutter disk (6) provided between the drive unit (5) and the upper cover (4);
wherein said cutter disk comprises a disk (61) with a centrally located core cutter (62) extending therefrom and a slot (63) extending from an outer edge of the disk to the core cutter that is provided with shredding means (64), and wherein the core cutter (62) extends beyond the shredding means (64);
wherein the feeding tube (42) is adjustable between a central position, where the feeding tube (42) is co-axial with the core cutter (62), and an eccentric position, where the feeding tube (42) is offset from the core cutter (62);
wherein the disk (6) comprises a disk top face (611) and a disk bottom face (612), and the slot comprises a first slot (631) and a second slot (632) arranged in a straight line;
said shredding means (64) comprising a fine shredding cutter (641) and a coarse shredding cutter (642), wherein the fine shredding cutter is fixed to the first slot (631) on the disk top face (611) and the coarse shredding cutter is fixed to the second slot (632) on the disk bottom face (612);
wherein the fine shredding cutter (641) comprises a first supporter (6411), a first shredding cutter blade (6412) and a first shredding cutter saw blade (6413);
the coarse shredding cutter (642) is provided with a second supporter (6421), a second shredding cutter blade (6422) and a second shredding cutter saw blade (6423); and
wherein a distance that the first supporter (6411) extends from the disk top face (611) is less than a distance that the second supporter (6421) extends from the disk bottom face (612), such that a distance between the first shredding cutter blade (6412) and the first shredding cutter saw blade (6413) is less than a distance between the second shredding cutter blade (6422) and the second shredding cutter saw blade (6423).

2. The multi-function food processor of claim 1, wherein the feeding tube (42) comprises a cylindrical feed tube (421b) and the upper cover is provided with a slider latch (422b) which facilitates the movement of the feeding tube between the central and eccentric positions, and wherein the bottom of the upper cover base (41) is provided with a stopper (423b) configured to limit the movement of the feeding tube (42) and the slider latch (422b) relative to the upper cover base (41).

3. The multi-function food processor of claim 2, wherein the body shell (3) comprises a gear enclosure (31) with a fixed ring (32) and a gear set cover (33) installed on the gear enclosure.

4. The multi-function food processor of claim 3, wherein the drive unit (5) comprises a motor (51) connected to a gear set (53) via a motor output shaft (52), and a gear frame (54), within which the cutter disk (6) is located;
a disk holder (55) is provided inside the gear frame (54), said disk holder being configured to mesh with the gear set (53); and
wherein the motor (51), the motor output shaft (52) and the gear set (53) are received in the gear enclosure (31) and the gear frame (54) is received in the fixed ring (32).

5. The multi-function food processor of claim 4, wherein the gear frame (54) comprises an upper frame (541) and a lower frame (542), with the disk holder (55) arranged between the upper and lower frame;
wherein the edge of the upper frame is provided with a groove (543); and
wherein a lower disc holder (544) is provided between the disk holder (55) and the lower frame (542), and an upper disc holder (545) is provided between the disk holder (55) and the upper frame (541).

6. The multi-function food processor of claim 1, wherein the body shell (3) comprises a gear enclosure (31) with a fixed ring (32) and a gear set cover (33) installed on the gear enclosure.

7. The multi-function food processor of claim 6, wherein the drive unit (5) comprises a motor (51) connected to a gear set (53) via a motor output shaft (52), and a gear frame (54), within which the cutter disk (6) is located;
a disk holder (55) is provided inside the gear frame (54), said disk holder being configured to mesh with the gear set (53); and
wherein the motor (51), the motor output shaft (52) and the gear set (53) are received in the gear enclosure (31) and the gear frame (54) is received in the fixed ring (32).

8. The multi-function food processor of claim 7, wherein the gear frame (54) comprises an upper frame (541) and a lower frame (542), with the disk holder (55) arranged between the upper and lower frame;
wherein the edge of the upper frame is provided with a groove (543); and
wherein a lower disc holder (544) is provided between the disk holder (55) and the lower frame (542), and an upper disc holder (545) is provided between the disk holder (55) and the upper frame (541).

9. The multi-function food processor of claim 7, wherein the gear set (53) comprises a drive shaft (531) arranged coaxially with a gear set holder (532), a bushing (533), a disk holder (534), a planetary gear set (535), and a drive gear body (536) with a drive gear (537); and wherein the disk holder (532) meshes with the drive gear body (536).

10. The multi-function food processor of claim 9, wherein the planetary gear set (535) comprises three planetary gear sets (5351, 5352, and 5353).

11. A multi-function food processor, comprising:
a body base (1), a body shell (3) and an upper cover (4), all configured to removably receive a bowl (2), and wherein the upper cover (4) has an upper cover base (41), a feeding tube (42) and a pusher (43) to urge food via the feeding tube (42) into the bowl (2);
a drive unit (5) provided inside the body shell (3);
a cutter disk (6) provided between the drive unit (5) and the upper cover (4);
wherein said cutter disk comprises a disk (61) with a centrally located core cutter (62) extending therefrom and a slot (63) extending from an outer edge of the disk to the core cutter that is provided with shredding means (64), and wherein the core cutter (62) extends beyond the shredding means (64);
wherein the feeding tube (42) is adjustable between a central position, where the feeding tube (42) is co-axial with the core cutter (62), and an eccentric position, where the feeding tube (42) is offset from the core cutter (62);
wherein the feeding tube (42) comprises a center feed tube (421a) coaxial with the cutter disk (6) and an outer feed tube (422a) on a side of the center feed tube (421a), and
wherein the center feed tube (421a) is configured to facilitate a formation of continuous spiral ribbons of food, and the outer feed tube (422a) is configured to facilitate a formation of strips of food.

12. The multi-function food processor of claim 11, wherein a feed tube cover (423a) is provided at the connection between the center feed tube (421a) and the outer feed tube (422a).

13. The multi-function food processor of claim 12, wherein the body shell (3) comprises a gear enclosure (31) with a fixed ring (32) and a gear set cover (33) installed on the gear enclosure.

14. The multi-function food processor of claim 13, wherein the drive unit (5) comprises a motor (51) connected to a gear set (53) via a motor output shaft (52), and a gear frame (54), within which the cutter disk (6) is located;
a disk holder (55) is provided inside the gear frame (54), said disk holder being configured to mesh with the gear set (53); and
wherein the motor (51), the motor output shaft (52) and the gear set (53) are received in the gear enclosure (31) and the gear frame (54) is received in the fixed ring (32).

15. The multi-function food processor of claim 14, wherein the gear frame (54) comprises an upper frame (541) and a lower frame (542), with the disk holder (55) arranged between the upper and lower frame;
wherein the edge of the upper frame is provided with a groove (543); and
wherein a lower disc holder (544) is provided between the disk holder (55) and the lower frame (542), and an upper disc holder (545) is provided between the disk holder (55) and the upper frame (541).

16. The multi-function food processor of claim 11, wherein the body shell (3) comprises a gear enclosure (31) with a fixed ring (32) and a gear set cover (33) installed on the gear enclosure.

17. The multi-function food processor of claim 16, wherein the drive unit (5) comprises a motor (51) connected to a gear set (53) via a motor output shaft (52), and a gear frame (54), within which the cutter disk (6) is located;
a disk holder (55) is provided inside the gear frame (54), said disk holder being configured to mesh with the gear set (53); and
wherein the motor (51), the motor output shaft (52) and the gear set (53) are received in the gear enclosure (31) and the gear frame (54) is received in the fixed ring (32).

18. The multi-function food processor of claim 17, wherein the gear frame (54) comprises an upper frame (541) and a lower frame (542), with the disk holder (55) arranged between the upper and lower frame;
wherein the edge of the upper frame is provided with a groove (543); and
wherein a lower disc holder (544) is provided between the disk holder (55) and the lower frame (542), and an upper disc holder (545) is provided between the disk holder (55) and the upper frame (541).

19. The multi-function food processor of claim 17, wherein the gear set (53) comprises a drive shaft (531) arranged coaxially with a gear set holder (532), a bushing (533), a disk holder (534), a planetary gear set (535), and a drive gear body (536) with a drive gear (537); and
wherein the disk holder (532) meshes with the drive gear body (536).

20. The multi-function food processor of claim 19, wherein the planetary gear set (535) comprises three planetary gear sets (5351, 5352, and 5353).

* * * * *